Aug. 2, 1960 D. A. ELLIS 2,947,048
METAL TRIM CLIP
Filed Oct. 27, 1958
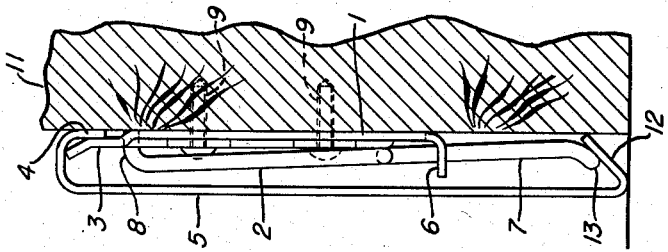
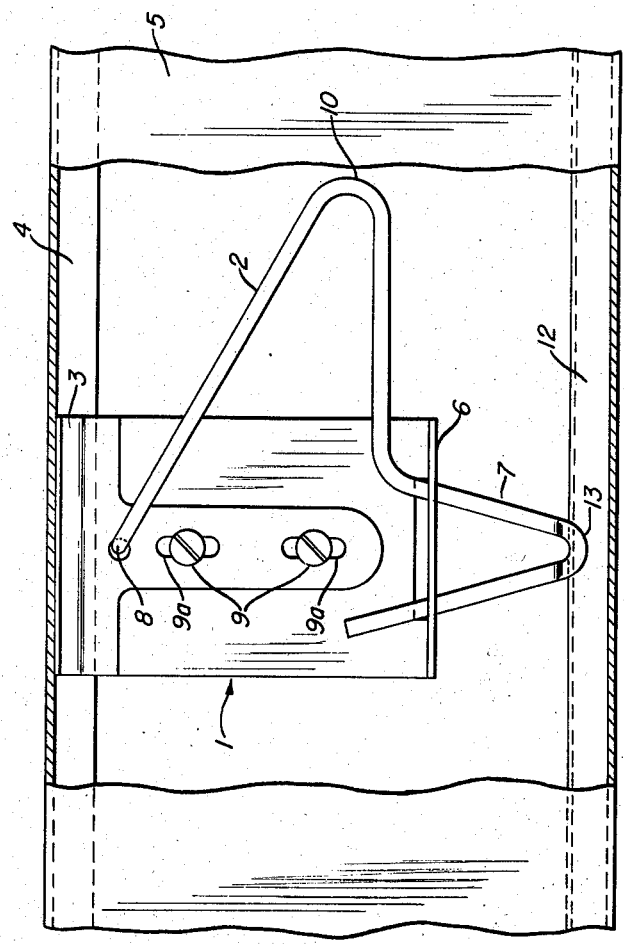
INVENTOR.
Donald A. Ellis
BY
Merriam, Lorch & Smith
ATTORNEYS United States Patent Office 2,947,048
Patented Aug. 2, 1960

2,947,048

METAL TRIM CLIP

Donald A. Ellis, Waukesha, Wis., assignor to Inland Steel Products Company, Milwaukee, Wis., a corporation of Delaware Filed Oct. 27, 1958, Ser. No. 769,671

4 Claims. (Cl. 24—73)

This invention relates to clips for holding metal trim in position and more specifically to a metal trim clip assembly which will hold the trim in position without the use of any exposed fasteners.

The use of metal trim has become wide-spread in the building industry. It is commonly used in place of wooden molding along the base of walls and around openings such as doors and windows. The clip assembly of this invention allows metal trim of this type to be readily installed and, once installed, to be easily removed without damage to either the trim or the clips. In position, the metal trim completely hides the clip assembly so that no portion thereof is exposed. The device will hold various styles of metal trim securely on all types of walls and other surfaces. Since there is a certain amount of play in the action of the clip assembly, it will compensate for irregular conditions which may exist, such as an irregular floor line when it is used for attaching base trim to the walls of a room.

The device of the invention will be better understood from the following description thereof and from the attached drawings, in which:

Figure 1 is a front view of a section of metal trim held in place by the clip assembly of this invention with a portion of the trim cut away to show the operation of the clip.

Figure 2 is a side-view of the trim and clip shown in Figure 1.

Referring to the figures, the clip assembly comprises two main components, a clip bracket 1 and a spring 2 formed of wire or other suitable material. The bracket is a substantially planar piece of sheet metal which is conveniently stamped in one piece, although it may obviously be assembled from separate components if so desired. Along one edge of the bracket there is an offset portion 3 which is adapted to receive the upper return lip 4 of the trim 5 when the bracket is fastened to a wall or other surface. Along the edge of bracket 1 opposite offset portion 3 is a slotted flange 6 which slidably engages the V-shaped nose portion 7 of spring 2 and prevents motion thereof away from the wall, i.e., in a direction perpendicular to the plane of the bracket. The end 8 of spring 2 is fixed relative to the bracket 1 so that nose portion 7 is effectively biased in a direction away from offset portion 3 by the resilient action of the partial loop 10 formed in the spring intermediate end 8 and nose portion 7. Fasteners 9 consisting of screws or the like passing through holes 9a in the bracket serve to fasten the same to the wall 11 or similar surface.

Installation of the trim on the clip assemblies of this invention is made in the following manner: After the clip assemblies are attached to the wall or other surface at suitably spaced intervals, depending on the size and weight of the trim, the rigidity thereof, etc., the lower return lip 12 of the trim is hooked over the apex 13 of nose portion 7, lifted against the force of the spring until the upper return lip 3 clears the top of bracket 1 and released, thereby permitting the return lip 4 to be caught in the space between the wall 11 and the offset portion 3 of the bracket. The downward force of the spring against the lower return lip 12 then functions to hold the trim tightly in place on the wall. To remove the metal trim the procedure is reversed, i.e., the trim is lifted until the upper return lip clears the bracket after which it is pulled free of the same and the lower return lip is disengaged from the apex of nose portion 7.

A small portion of the nose portion 7 of spring 2 on either side of apex 13 has been shown in the drawings as bent to form an obtuse angle with the remainder of the nose portion. This is a desirable but not essential feature of the clip assembly. By bending this section of the nose portion in the manner shown to follow the angle of the lower return lip, the bearing surface between the spring and the trim is increased, thereby improving the holding action of the spring.

Although the clip assembly of the invention has been described with reference to trim made of metal, no limitation is implied thereby, since the clip assembly can obviously be used with trim made of any other suitable material, such as plastic.

The foregoing detailed description has been given for clearness of understanding only and no unnecessary limitations should be understood therefrom as modifications will be obvious to those skilled in the art.

What is claimed is:

1. A clip assembly for attaching metal trim to walls and the like comprising in combination a substantially planar bracket having an offset portion along one of its edges for engaging an edge of said metal trim; a spring member having one end fixed relative to said bracket and having a V-shaped nose portion including an apex adapted to engage an opposite edge of said metal trim at the other end and a resilient portion comprising two legs joined at an angle intermediate said fixed end and said nose portion, said resilient portion serving to bias said nose portion in a direction away from the offset portion of said bracket; guide means on said bracket opposite said offset portion slidably engaging said nose portion and restraining the same from movement in a direction perpendicular to the plane of said bracket; and means for securing said clip assembly to said walls and the like.

2. The clip assembly of claim 1 wherein part of said nose portion including the apex thereof extends in a plane at an obtuse angle with respect to the remainder of said nose portion.

3. The clip assembly of claim 1 wherein said guide means is an integral part of said bracket and comprises a flange having a slot therein.

4. A clip assembly for attaching metal trim to walls and the like comprising in combination: a substantially planar bracket having an offset portion along one of its edges for engaging an edge of said metal trim and guide means comprising an integral flange having a slot therein along an edge of the bracket opposite said offset portion; a resilient spring member having two legs joined at an acute angle, one of said legs having near its end a V-shaped nose portion including an apex adapted to engage an opposite edge of said metal trim, said nose portion having a section including its apex which extends at an obtuse angle with respect to the remainder of said nose portion, the other of said legs having its end fixed with respect to said bracket, said guide means slidably engaging said nose portion and restraining the same from movement in a direction perpendicular to the plane of said bracket; and means for securing said clip assembly to said walls and the like.

(References on following page)

References Cited in the file of this patent

UNITED STATES PATENTS

| | | |
|---|---|---|
| 2,283,151 | Van Uum | May 12, 1942 |
| 2,604,680 | Brack | July 29, 1952 |
| 2,604,776 | Goldsmith | July 29, 1952 |
| 2,846,743 | Patton | Aug. 12, 1958 |
| 2,867,305 | Baker | Jan. 6, 1959 |

FOREIGN PATENTS

| | | |
|---|---|---|
| 715,125 | France | Sept. 21, 1931 |
| 1,130,316 | France | Sept. 24, 1956 |